United States Patent [19]
Garinger

[11] 3,758,955
[45] Sept. 18, 1973

[54] ADJUSTABLE SCRIBER ATTACHMENT FOR HEIGHT GAUGE

[76] Inventor: Jesse D. Garinger, 12421 Oakwood St., Garden Grove, Calif.

[22] Filed: Sept. 25, 1970

[21] Appl. No.: 75,435

[52] U.S. Cl............................................... 33/169 R
[51] Int. Cl. ............................................. G01b 3/20
[58] Field of Search ............... 33/170, 169 R, 143 I, 33/143 J, 143 K

[56] References Cited
UNITED STATES PATENTS

| | | | |
|---|---|---|---|
| 2,454,327 | 11/1948 | Malsom............................ | 33/169 R |
| 2,932,899 | 4/1960 | Arzoian........................... | 33/169 R |
| 101,689 | 4/1870 | Whitmore........................ | 33/143 K |
| 1,507,669 | 9/1924 | Econom..................... | 33/143 K UX |
| 1,942,118 | 1/1934 | Pignone........................... | 33/169 R |
| 2,664,639 | 1/1954 | Denny............................... | 33/169 R |
| 2,841,876 | 7/1958 | Pittenger............................. | 33/170 |

FOREIGN PATENTS OR APPLICATIONS

| | | | |
|---|---|---|---|
| 571,221 | 8/1945 | Great Britain.................. | 33/170 |
| 818,429 | 10/1951 | Germany......................... | 33/169 R |
| 1,354,153 | 1/1964 | France............................. | 33/143 K |
| 18,061 | 10/1898 | Switzerland.................... | 33/143 K |

*Primary Examiner*—Robert B. Hull
*Attorney*—Fowler, Knobbe and Martens

[57] ABSTRACT

The attachment is comprised of two L-shaped members held together slideably, one having an arm extending in a first direction and adapted to be clamped to the measuring blade of a height gauge and the other L-shaped member having an arm parallel to the first arm, extending in a direction opposite thereto, and carrying a scribing edge at its end. By thus providing a scriber edge which is slideable relative to the height gauge the operation of any height gauge with which the attachment is used can be simplified and accelerated. A gear-driven eccentric pin and slot arrangement serves for manual relative adjustment of the L-shaped members.

1 Claim, 9 Drawing Figures

PATENTED SEP 18 1973  3,758,955
SHEET 1 OF 2
Fig. 1.
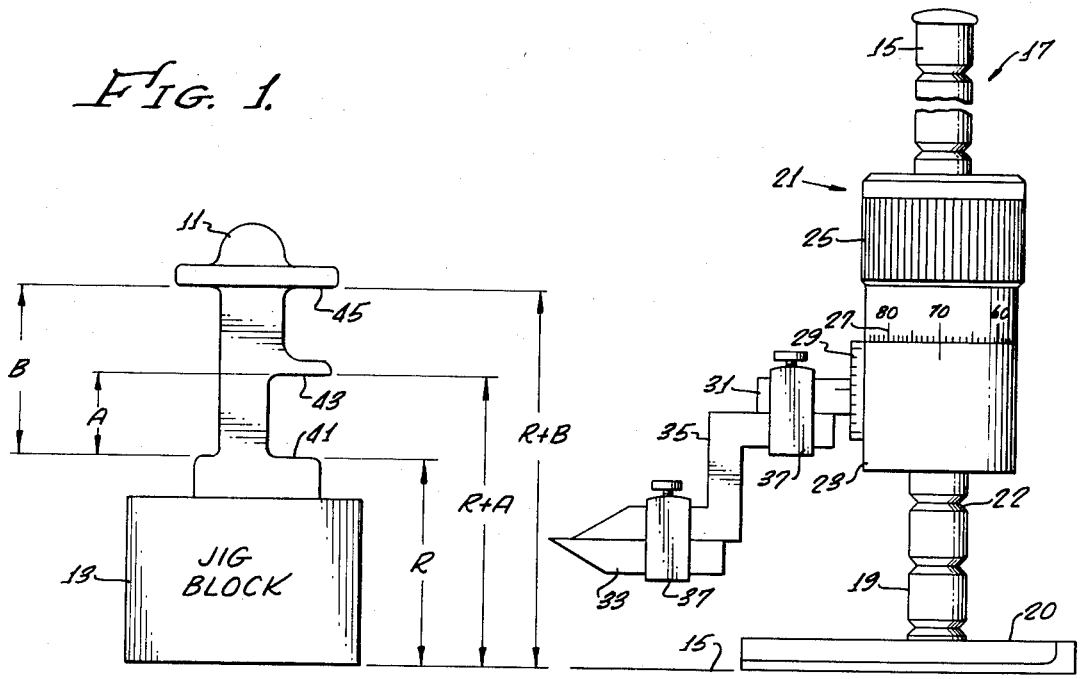
Fig. 2.
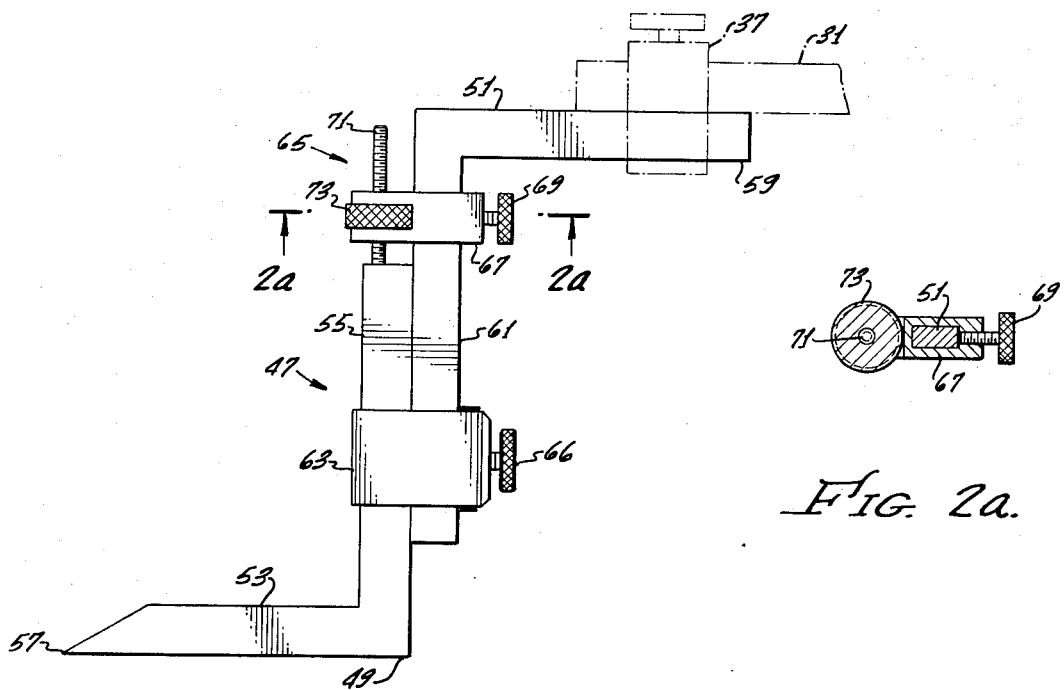
Fig. 2a.
INVENTOR.
JESSE D. GARINGER
BY FOWLER, KNOBBE
& MARTENS
ATTORNEYS.

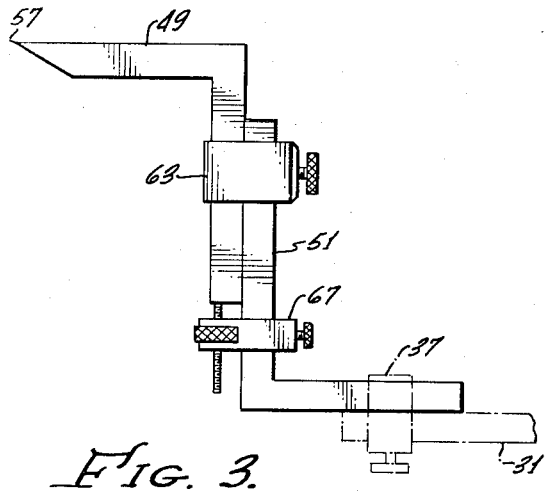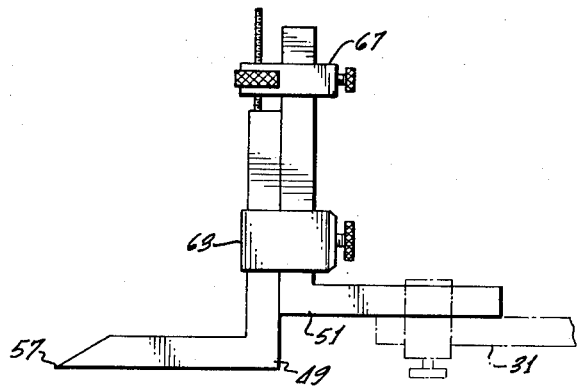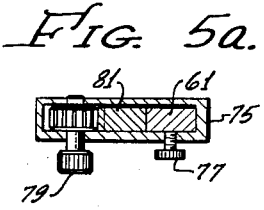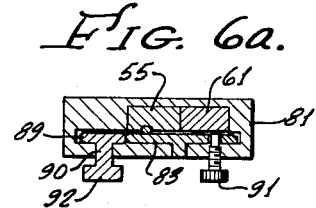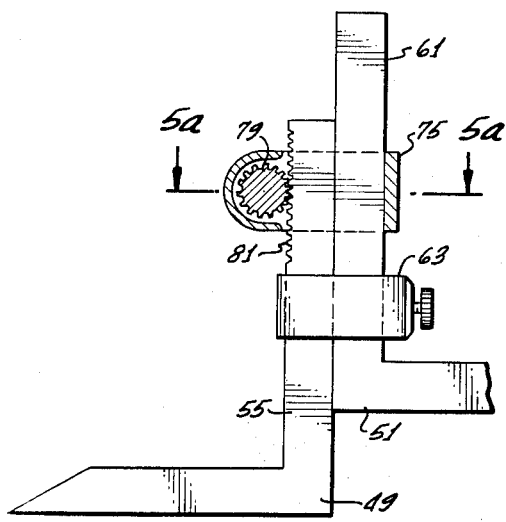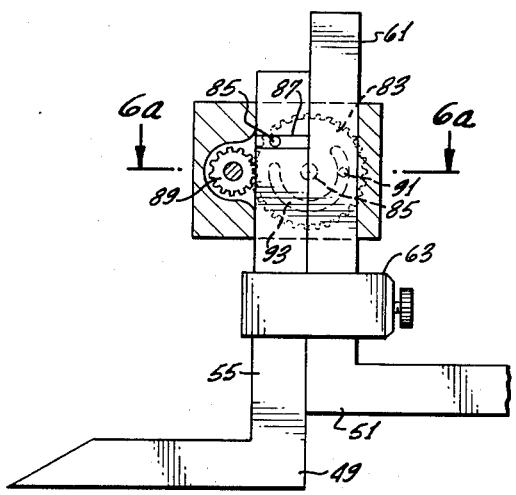

ADJUSTABLE SCRIBER ATTACHMENT FOR HEIGHT GAUGE

The present invention relates to an adjustable scriber for a height gauge and serves to make the standard height gauge easier to use in setting up dimensions on castings and similar parts which are to be machined. The conventional height gauge is an expensive instrument, it is very precise but it is also quite slow to use. Typically the casting upon which dimensions are to be marked from a blueprint is set upon a jig block. Once the casting has been set up in this way, the height gauge is used to determine the precise height of one or more lines on the casting, each of which defines a reference or datum plane along the then vertical axis of the part. Such a datum plane may be any distance from the table and will usually be some odd number of thousandths of inches, such as for example 2.735 inches. Assuming that there is only one datum plane given, all of the dimensions of the casting which need to be marked for machining, or for checking for casting accuracy, are given on the drawing with reference to that datum plane. But, since the height gauge rests on the surface of the table, it must be set to a dimension which is the sum of (1) the height of the datum plane above the surface of the table and (2) the height of the particular dimension above the datum plane. This process of addition can be very time consuming. With a part of average complexity in which about fifty points need to be set up, even with the use of an adding machine the process may take 2 hours. By use of the invention, this time has been reduced to about 40 minutes.

Broadly speaking, the adjustable scriber of the present invention has two members which are movable relative to one another. One is an L-shaped member which is attached to the blade of the height gauge. The other member is a scriber arm which is slideably mounted on the L-shaped member and has a known range of travel relative to it. In setting up the casting, the height gauge is adjusted so as to bring it to such an even inch setting as will permit the scriber arm to be moved along the L-shaped member into alignment with the datum plane on the casting. The next step then is to move the scriber arm into alignment with the datum plane on the casting. When this step has been carried out, the scriber arm is clamped tightly against the L-shaped member. The apparatus is now ready to be used since, from this point on, all of the dimensions which are marked on the drawing with reference to the datum plane can be quickly translated into the proper settings on the height gauge simply by adding to each dimension the even inch setting which was initially selected on the height gauge. For example, if that even inch setting was four inches, a distance of 0.35 inches above the datum plane will be found by setting the height gauge at 4.35 inches. Thus, the step of addition has been simplified sufficiently to make it practically instantaneous.

The present invention and its advantages will be more clearly understood with reference to the following description including a preferred embodiment thereof taken in conjunction with the accompanying drawings wherein:

FIG. 1 illustrates the manner in which dimensions are presently set up with a conventional height gauge;

FIG. 2 illustrates an exemplary embodiment of an adjustable scriber incorporating features of the present invention and attached to the blade of a height gauge of the type shown in FIG. 1;

FIG. 2a is a sectional view taken along the plane 2a—2a in FIG. 2, showing the internal mechanism of the bracket, knurled nut, and threaded bolt combination;

FIG. 3 illustrates the same height gauge shown in FIG. 2 but with its position relative to the height gauge blade being reversed in order to extend its range;

FIG. 4 illustrates the same adjustable scriber shown in FIG. 2 but with its parts being assembled differently in order to bring its scriber to a position intermediate the position it assumes when the adjustable scriber is installed as shown in FIGS. 2 and 3;

FIG. 5 shows an alternative embodiment of the adjustable scriber in which the means for moving one of its members relative to the other is a rack and a pinion; and FIG. 5a is a sectional view taken along the plane 5a—5a in FIG. 5, showing the internal mechanism of the bracket, pinion, and rack combination;

FIG. 6 is a third embodiment of the adjustable scriber in which the means for moving its parts relative to one another includes a pinion and a gear.

FIG. 6a is a sectional view taken along the plane 6a—6a in FIG. 6, showing the internal mechanism of the bracket, pinion and gear combination.

The time consuming nature of setting up dimensions from a drawing by means of a height gauge on a part which is to be machined may be best understood by referring to FIG. 1 in which a casting 11 is seated on jig block 13 which rests on a table 15 next to a micrometer height gauge 17. The height gauge 17 is illustrated to be of the type described in U.S. Pat. No. 2,841,876 issued to H.C. Pittenger, and having a precisely machined upright post 19 supported by a base 20 with a plurality of grooves 22 spaced apart upon the post at precisely ½ inch intervals. Mounted on the shaft 19 is a micrometer 21 which includes a barrel 23 and a thimble 25 mounted rotatably upon the barrel 23. The barrel can be moved up or down on the shaft 19 and, by means of a detent mechanism inside the barrel and adapted to lock into one of the grooves 22, the barrel 23 may be quickly and precisely positioned with reference to one of the grooves. A measuring blade 31 extends horizontally from within the barrel 23 and is moved axially as the thimble 25 is turned. A circular dial 27 and a linear dial 29 serve to indicate the precise position of the blade 31 relative to the base 20. Usually the grooves 22 are so positioned that when the scales 27 and 29 are set precisely to zero, the arm 31 is an even number of inches above the bottom of the base 20.

A scriber 33 is mounted to move with the blade 31 either directly or, as shown in FIG. 1, through an intermediate offset scriber 35 which is rigidly attached at its ends by means of clamps to the blade 31 and to the scriber 33. In either case, the scriber 33 is mounted so that it is precisely parallel to the blade 31.

For illustrative purposes the casting 11 is shown to have a first surface 41 which serves as the datum plane and whose distance above the table 15 is R. It is also assumed that the drawing according to which the casting 11 is to be machined calls for second and third surfaces 43 and 45 to be displaced vertically from the datum plane 41 by dimensions A and B respectively. In order to either mark or check the correctness of the surfaces 43 and 45 on the casting 11 the dimension R must first be determined and then the additions R + A and R + B must be performed, following which the height gauge may be raised to the positions R + A and R + B for marking or measuring the dimensions 43 and 45. As indicated previously, since it is almost certain that both the dimension R and the dimensions A and B are odd numbers, each arithmetic step calls for the addition of typically two four digit numbers and must be done on paper or by an adding machine.

The need for these operations is eliminated by the adjustable scriber illustrated in FIG. 2. Basically, it includes a pair of L-shaped members 49 and 51, the first member having a pair of arms 53 and 55 extending exactly 90° apart and the second member 51 similarly having a pair of arms 59 and 61 which also are spaced exactly 90° apart. The first arm 53 of the first L-shaped member 49 terminates in a scribing edge 57 while the first arm 59 of the second L-shaped member 51 is adapted to be fastened by a clamp 37 to the measuring arm 31 of a height gauge such as that shown in FIG. 1. In keeping with the invention, the second arms 55 and 61 of the two L-shaped members are held slideably against one another as by a spring loaded clamp 63, and means 65 are provided for sliding the arm 55 upon the arm 61. A knurled nut 66 on the clamp serves to lock the two L-shaped members 49 and 51 together. Significantly, the first arms 53 and 59 of the respective members 49 and 51 are precisely parallel, and remain so in all relative positions of the two members. Since the measuring arm 31, to which the first arm 59 is attached, is precisely parallel to the surface of the table 15, so is the arm 53, throughout its travel.

In the particular arrangement illustrated in FIG. 2 the sliding means 65 comprises a bracket 7 mounted slideably upon the arm 61 and having a knurled nut 69 rotatably fixed in the bracket and threaded upon an adjusting screw 71 which is anchored upon and which extends from the end of the arm 55 of the L-shaped member 49. Means, in the form of a knurled nut 69 screwed into the wall of the bracket 67, are also provided to clamp the bracket to the arm 61. The arm 59 of the L-shaped member 51 is fastened by means of the clamp 37 to the arm 31 of the height gage 17. Both of the knurled nuts 66 and 69 are loosened and the second L-shaped member 49 is slid upon the first L-shaped member 51 until the scribing edge 57 is approximately aligned with the datum surface 41 (FIG. 1). The knurled nut 69 is then tightened so as to anchor the bracket 67 upon the arm 61 of the L-shaped member 51. Then, the knurled nut 73 is turned upon the screw 71 so as to slide the member 49 relative to the member 51 precisely and gradually. This continues until the scribing edge 57 is precisely aligned with the datum plane 41. When this point is reached the knurled nut 66 is tightened, thereby locking the two L-shaped members 49 and 51 securely to one another.

It will be understood that the measuring blade 31 of the height gauge 17 is set at an even number of inches above the table 15 by turning the micrometer to an even inch setting. With the adjustable scriber of FIG. 2 set up as just described, the first surface 43 can be readily set up by repositioning the micrometer of the height gauge 17 to a setting, which as described previously, is equal to the sum of its initial setting and the dimension A given on the drawing for the part 11 as the distance between the surfaces 41 and 43. Similarly the surface 45 can be set up by positioning the micrometer of the height gauge 17 to a setting equal to the sum of the initial setting of the micrometer and the dimension B as shown in FIG. 1.

As illustrated in FIGS. 3 and 4, the configuration of the adjustable scriber of the present invention can be readily changed so as to make its use more convenient, particularly where it is desired to increase the measuring range of the height gauge and also where it is desired to bring the level of the scribing edge 57 to a convenient height. Thus, where it is desired to extend the range of the height gauge 17 upward, the relative positions of the two L-shaped members 49 and 51 may be reversed as shown in FIG. 3. Similarly where it is desired to bring the level of the scribing edge 57 approximately to the same height as that of the measuring blade 31, the position of the entire adjustable scriber may be reversed relative to the measuring blade 31 so that the L-shaped members 49 and 51 point in the same direction, as shown in FIG. 4.

An alternative arrangement for moving the first L-shaped member 49 relative to the second L-shaped member 51 is illustrated in FIG. 5. The bracket 67 of FIG. 2 is replaced by a slightly different bracket 75, carrying a knurled nut 77 which serves to anchor the bracket 75 to the arm 61 of the second L-shaped member 51. To move the first L-shaped member 49 relative to the second L-shaped member 51 a pinion 79 is journaled in the bracket 75 for rotation therein. The pinion 79 engages a rack 81 cut in the side of the arm 55 of the first L-shaped member 49 so that as the pinion 79 is turned in the bracket 75, it causes the entire member 49 to move along the other L-shaped member 51.

As embodied in the present invention, the arrangement for moving the L-shaped members 49 and 51 relative to one another is shown in FIG. 6. In this embodiment, the arms 51 and 55 extend through yet another type of bracket 81. A gear 83 is mounted within the bracket 81 to rotate about an axis 85. A pin 85 extends axially from the gear 83 and fits into a slot 87 in the arm 44 of the first L-shaped member 49. The teeth of the gear 83 are engaged by a driving pinion or gear 89 carried by a short shaft 90 journaled for rotation in the bracket 81 and having a driving knob 92 at its end. Finally, a threaded bolt 91 extends through the wall of the bracket 81 and through an arcuate slot 93 in the gear 83 to permit the bracket to be locked upon the arm 61. Once the bracket 81 has been locked upon the arm 61 by means of the bolt 91 the L-shaped member 49 can be moved along that arm by turning the driving gear through the knob 92.

What is claimed is:

1. An adjustable scriber attachment for a height gauge, said attachment comprising:
    a. a first L-shaped member, including a first arm, one end of which is the scriber edge, and a second arm, extending precisely 90° from said first arm;
    b. a second L-shaped member, including a first arm, one end of which is adapted to be attached to the arm of said height gauge, and a second arm, extending precisely 90° from said first arm;
    c. means for slideably holding together said second arms of said first and second L-shaped members while maintaining said first arms of said members precisely parallel; and d. means for moving said second arm of said first L-shaped member slideably along said second arm of said second L-shaped member comprising,
  i a bracket mounted slideably upon said second arm of said second L-shaped member,
  ii means for locking said bracket to said second arm of said second L-shaped member,
  iii a gear rotatably mounted upon said bracket and carrying an axially extending pin received in a transverse slot in said second arm of said first L-shaped member, and
  iv a pinion rotatably mounted upon said bracket for drivingly engaging said gear.

* * * * *